United States Patent [19]

Robinson et al.

[11] Patent Number: 4,924,331
[45] Date of Patent: May 8, 1990

[54] METHOD FOR MAPPING AROUND DEFECTIVE SECTORS IN A DISC DRIVE

[75] Inventors: Don M. Robinson, Santa Clara County; Henry E. Davenport, Santa Cruz County, both of Calif.

[73] Assignee: Seagate Technology, Inc., Scotts Valley, Calif.

[21] Appl. No.: 197,247

[22] Filed: May 23, 1988

Related U.S. Application Data

[63] Continuation of Ser. No. 800,062, Nov. 20, 1985, Pat. No. 4,746,998.

[51] Int. Cl.⁵ .......................... G11B 15/18; G11B 5/09
[52] U.S. Cl. ...................................... 360/72.1; 360/49
[58] Field of Search .................... 360/31, 49, 60, 53, 360/72.1

[56] References Cited

U.S. PATENT DOCUMENTS 4,214,280  7/1980  Halfhill et al. .................... 360/53

Primary Examiner—Vincent P. Canney
Attorney, Agent, or Firm—Flehr, Hohbach, Test, Albritton & Herbert

[57] ABSTRACT

The defect list, as supplied by the manufacturer, is stored on the outer tracks of the disk. It is merged with the user supplied media defect list during formatting and used to flag defective sectors. During initialization the merged defect list is loaded into a section of dynamic memory so that it is accessible during seeking of a particular address.

22 Claims, 3 Drawing Sheets

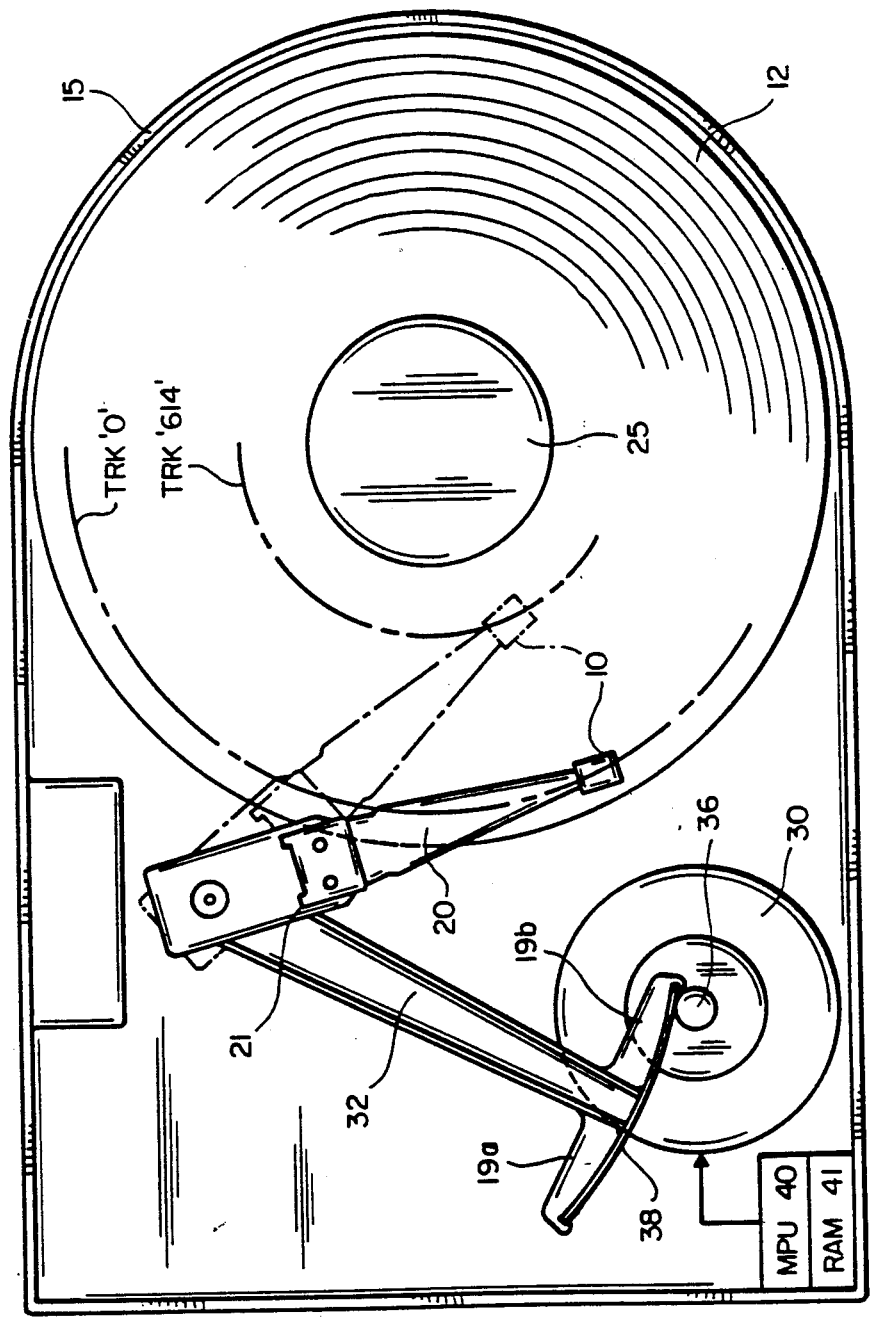
FIG_1

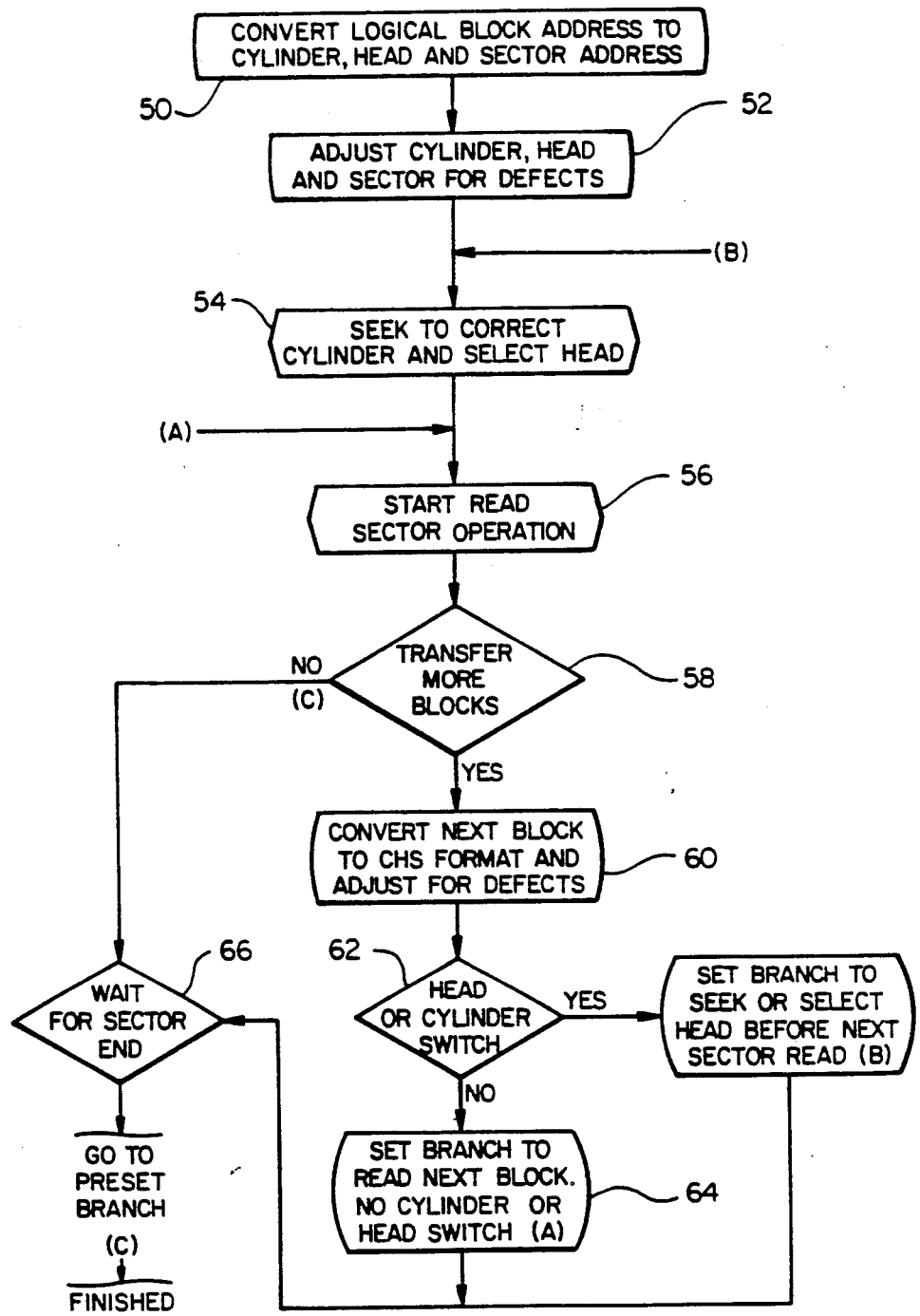
FIG_2

DEFECT MANAGEMENT BY SECTOR SLIP

CYLINDER 0   HEAD 3

| 51 | 52 | 53 | 54 | 55 | 56 | 57 | ✗ | 58 | 59 | 60 | 61 | 62 | 63 | 64 | 65 | 66 |

DEFECTIVE SECTOR

CYLINDER 1   HEAD 0

| 67 | 68 | 69 | 70 | 71 | 72 | 73 | 74 | 75 | 76 | 77 | 78 | 79 | 80 | 81 | 82 | 83 |

FIG_3

METHOD FOR MAPPING AROUND DEFECTIVE SECTORS IN A DISC DRIVE

This is a continuation of application Ser. No. 800,062 filed November 20, 1985 now U.S. Pat. No. 4,746,998.

This invention relates generally to magnetic disc memory apparatus and more particularly to means for improving performance of a disc drive by improved defect management.

Disc drive systems record and reproduce information stored on concentric circular tracks recorded on magnetic discs. The tracks are written and read by a magnetic transducer which cooperates with the surface of the disc. The transducer is positioned over a selected track or cylinder on the disk by an actuator mechanism. Detailed disclosure of disc drive machines and especially a typical linear actuator for positioning the transducers in alignment with a selected cylinder or track on the surface of a disc is found in U.S. Pat. No. 4,323,939; a rotary actuator incorporating a stepper motor for positioning a transducer is found in U.S. application Ser. No. 613,163 filed May 23, 1984. Both are incorporated herein by reference.

Disc drives, especially the positioning devices, are microprocessor controlled. The microprograms typically provided for disc drive controllers are required to meet strict customer and IO interface requirements. The interface requirements and the size of the programs require long development and test cycles before the programs can be committed to ROM or EPROM for production. Once the commitment has been made to put a program in ROM, it is difficult to correct any problems. Thus, products that are manufactured in high volume, with microprograms stored in ROM memory, have high cost per engineering changes which affect the ROMs, i.e., require scrapping the ROMs which have been previously manufactured.

Further, ROM/EPROM based products are difficult to customize for specific customer requirements, as each modification to the program requires a new ROM or EPROM.

Another major problem with storing all the control information for a disc drive in ROM, is that manufacturing testing of such a product is difficult as all the test programs must be held within the ROM. Further, it makes defect management difficult and inefficient.

It is an objective of this invention to provide an improved means for storing some of the controlling operating data in a microprocessor controller disc drive.

A further objective of this invention is to improve the system for controlling the data transducer in rotating disc data storage equipment.

Another objective of this invention is to improve the performance and reliability of rotating disc data storage devices while reducing its complexity and cost of manufacture.

A further objective of this invention is to increase the capacity of the rotating disc data storage device without increasing its complexity or cost of manufacture.

Yet another objective of this invention is to provide a more efficient approach to defect management. More specifically, in typical disc drive systems, any defective block on a track will cause the entire track to be flagged as defective. This results in a considerable loss in capacity.

It is an objective of this invention to bypass defects at a track sector level rather than at a track level.

Yet another objective of this invention is to provide a rotating disc data storage device with internal means for dynamically storing a defect list at a sector level to enhance maintenance and adjustment of the device.

Another objective of this invention is to provide a means for storing a data list which may be comprised of both the manufacture generated data defect list and a user supply defect list. Such storage of a manufacturer's defect list in dynamic memory will allow it to be generated by special test equipment, saved on disc in a specially protected area, and accessed by the controller to directly bypass defects without unnecessary seeking steps. Such defect management approach also allows for a user supplied defect list which may be added to the manufacturer's defect list, saved on the disk for future format operations and if necessary removed on command.

These and other objectives of this invention are achieved in a disc drive wherein two outer tracks of the disc in a region beyond the defined track 0 of a disc are used to store the drive operating microprogram, and/or manufacturing test program and/or specific mechanical perameters and media defect information. This information can be read from these outer tracks of the disc during initialization of the disc drive, or during seek operations of the drive. It allows the disc drive to react to microprogram problems without changing either a mask ROM or an EPROM. The microprogram is read onto the drive over the IO interface.

Writing the microprogram on the disc of the drive to be customized for each customer. This can be done by loading a customer's specific program on the drive at final test.

The product yield is also improved by this process as specific mechanical yield on electrical perameters can be adapted to by including these in the drive microprogram.

In the specific embodiment of the present invention, the defect list is stored as supplied by the manufacturer on the outer track of the drive. It is merged with the user supplied defect during formatting, and used during formatting to flag defective sectors. During initialization of the disc drive, is loaded into a section of dynamic memory so that it is quickly accessible during seeking of a particular address.

Thus, when a seek command is received, the defect list can be accessed, and the positioning command is modified to avoid accessing of a defective block, instead directly accessing the next fully effective block.

This invention can be better understood by reference to the following figures:

FIG. 1 is a plan view of a disc drive with which this invention is useful;

FIG. 2 is a block diagram of the sequence of steps to be followed in addressing a particular sector on a disc drive track;

FIG. 3 illustrates the arrangement of particular cylinders heads and sectors on a disc drive as shown in FIG. 1.

The typical disc drive as shown in FIG. 1 includes a plurality of discs 12 stacked on a spindle 25 for rotation by a spindle motor. A transducer 10 is positioned over any of the tracks 0–685 for reading or writing data on the selected track. The positioning occurs under control of a stepper motor 30 in response to commands from a microprocessor 40. Rotation of the stepper motor 30 and its spindle 36 causes a band 38 which is connected to the head 19 of arm 32 to wind and unwind on the spindle 36, moving the arm 20 and associated transducer 10 to the selected track. The following physical characteristics are typical of a disc drive and will be referred to in the explanation below: 615 cylinders (numbered 0–614), 4 heads (tracks per cylinder) (numbered 0–3), 17 sectors per track (numbered 0–16), 512 data bytes per sector, 41,820 sectors per head (numbered 0–41819).

In addition, the drive has two additional cylinders identified as −1 and −2 cylinders, with four tracks each, formatted 256 bytes per sector, 32 sectors per track and with a 1 to 1 interleave factor.

The objective of this invention is to minimize the time spent in mechanically seeking for the correct track. Such improper seeking can occur if the original seek is carried out to a block or track which is in fact defective.

Such disc media defects fall into two categories. One category comprises defects identified by the manufacturer during the course of testing, using stress enlarging techniques. These defects are supplied in a list in cylinder, head, and bytes from index formats. An example of the numbering scheme appears in FIG. 3. The cylinder 0 is a reference to the fact than in a disc drive having multiple data storage surfaces on discs, track 0 on each disc is defined as lying on a single cylinder 0. A separate head or transducer 10 reads and writes the data on each disc surface. Therefore, a particular location in any disc surface may be particularly identified by defining the cylinder and the head number (these two together combining to identify a particular track on a particular disc surface) followed by identifying a particular sector.

Other defects which must be taken into account are those identified by the user over a period of time. These defects are supplied in a list in logical block address format. The defect information and operating systems and the like may be stored on a disc drive for ready access in the disc drive on tracts −1 and −2 identified above.

In order to make best use of the defect list, the following steps are taken. First, the manufacturer's defect list is converted into a physical cylinder, head, sector format to make up the known defect list.

Secondly, the defective sectors are flagged so that they are functionally bypassed.

Thirdly, a method is provided for the user to add defects to the known defect list using logical block address format. (It is well known in the disc drive field to convert logical block addresses into cylinder head and sector addresses as most seek commands are initially input as logical block addresses.)

Fourth, the added defects are converted to physical cylinder head sector format, taking into account previous defects and the interleave factor in the discs.

Fifth, the added defects are merged into the known defect list.

And finally, the logical block address is translated into cylinder head and sector addresses and adjusted for defects to avoid performance hits during seek.

Considering these steps in detail, the first step is the conversion of the manufacturer's defect list into a physical cylinder, head, sector format. This becomes the known defect list. This is accomplished by taking the entry in the manufacturer's list and plugging cylinder and head into the known defect list and looking at the sector defect map to find the sector number or numbers that contain a comparable range for the bytes from index number. When a sector number match is found, that number is added as an entry into the known defect list. The last number in the known defect list is a relative defect in the list with the first entry being 1, the second entry 2, the third entry 3, and so on. All of this technique is well known in this technology.

The entries in the sector defect map overlap to account for gaps and speed variations, so it is possible for one manufacturer's defect entry to become two entries in the known defect list. Basically, the objective is to provide a list of defects defined in terms of cylinder head and sector on the disc of a particular disc drive.

Next, the defective sectors are flagged so that they are functionally bypassed. During format unit operation, the disc is incrementally formatted a track at a time, starting at cylinder 0, track 0, to cylinder 614, track 3. The first sector on cylinder 0 track 0 is formatted as logical block 0. The logical block address is incremented across the entire disc and not reset to 0 on track or cylinder boundaries. Before formatting each track, a table with an entry for each physical sector on the track is generated. Referencing the known defect list, any defective sectors are marked defective. The remaining sectors are numbered taking into account the interleave factor. The defective sector does not get a logical block address and does not cause a logical block address to be skipped. It merely means one less logical block for each defect encountered. Thus, this step is basically an extension of known formatting and sector addressing techniques, with the only modification being in the numbering scheme to take into account the defects which have been identified so that they are not given addresses and are not addressed during any data access command.

Next, the user can add defects to the known defect list using logical block address format, simply by using the standard manual format commands which are well known in the disc drive industry.

Next, the added defects are converted to cylinder head and sector format taking into account previous defects and the interleave factor. Thus, these are simply eliminated as possible addresses for data storage so that they are not reaccessed.

Next, the added defects are merged with the known defect list into a scratch pad area, in the microprocessor 40, then copied back into the known defect list so that a single merged list is generated.

Now, when a read command which comprises a logical block address as shown in FIG. 2 is received, it is converted into a cylinder head and sector address and adjusted for defects to avoid performance hits during seek time. In order to accomplish this, when the disc drive 15 is powered on, the known defect list is loaded into a RAM 41 which is part of MBU 40. (In this way, when new defects are added by a format command by the user, the new known defect list is written back to the −2 cylinder so that the latest updated defect list is always available to upload a power on time during operation is always available in the RAM 41.)

Read/write and seek commands are presented in logical block format to the microprocessor 40. In order to correctly position the actuator 32, and select the correct head 10, the logical block address is converted to target cylinder head and sector address at step 50. This alone would be enough information to correctly position the actuator head and select the correct head if there were no defects. The average seek time for such an operation is 65 milliseconds, with track time being 20 milliseconds. Because the known defect list is available in RAM at all times, the computed cylinder head and sector can be accurately corrected for defects as shown in the following steps in approximately 70 microseconds, thus avoiding a 60 ms to 20 ms seek to wrong track and a subsequent 20 ms to 65 ms reseek to the correct track is a considerable time saver. Thus simply by converting the incomming block address to cylinder head and sector address, and adjusting for defects, at 52, a seek to correct cylinder and head is immediately achieved.

For example, looking at the defective sector shown in FIG. 3, without the benefits of this invention, a command to read sector 67 would have initially required a seek to cylinder stroke but because the defective sector 67 is now on cylinder 1, a reseek with the necessary time to carry out this reseek would have had to occur. Instead, an automatic adjustment is made to the correct seek address with no loss in performance.

Thus following step 52, a seek to the correct cylinder and head position is immediately carried out and a read operation conducted at 56. If more blocks are to be transferred as shown at the decision block 58, the next block is converted to cylinder head sector format at step 60; the necessary cylinder or head switch is carried out at step 62; and a branch is carried out to select the correct head. Then the program returns to step 54 to seek the cause the actuator to seek the correct track address. If no cylinder or head switch is required at step 62, the next block is immediately read at step 64 followed by a return to the command to wait for the end of the sector at 66 and then branching to the finish of the program.

In summary, by providing for an adjustment for defects immediately upon receipt of a block address from a user as part of a seek command, considerable time and performance is saved. Further, an improvement is achieved over prior art methods which an entire track had to be flagged defective with alternate data tracks being provided for storage of the data intented to be stored in the defective blocks. This alternative approach resulted in a considerable loss in capacity.

Alternatives to the present invention may become apparent to a person of skill in the art who studies this invention disclosure. Therefore, the scope of the present invention is to be limited by the claims which follow.

What is claimed:

1. In a microprocessor controlled disc drive including at least one constantly rotating disc having a plurality of concentric tracks where data is written and read, and means for positioning a transducer relative to a specified track on said disc for reading and writing data thereon, said positioning means being responsive to user-initiated commands to position said transducer head on user-accessible tracks on said disc and read or write data, the improvement comprising means for storing multiple copies of controlling operating data relative to said user-initiated commands on non-user accessible tracks of said disc, means for accessing said controlling operating data and for modifying said user-initiated commands in accordance with said controlling operating data for controlling said seek to position said transducer over a selected track.

2. A disc drive as claimed in claim 1 including means operable for reading said controlling operating data from said non-user-accessible tracks into a random-access memory during initialization of said disc drive, said microprocessor accessing said controlling operating data in said random access memory in the course of controlling a seek sequence to position said transducer over the target track.

3. A disc drive as claimed in claim 1 wherein said means for storing operating data comprise means for assigning consecutive numbers to the non-defective blocks on said disk thereby eliminating reference in said disc drive to the defective blocks on said disc surface, and storing said consecutive block list on the surface of said disc on said non-user-accessible tracks.

4. A disc drive as claimed in claim 3 including means operable for reading said controlling operating data from said non-user-accessible tracks into a random-access memory during initialization of said disc drive, said microprocessor accessing said controlling operating data in said random access memory in the course of controlling a seek sequence to position the transducer over the target track, and reading data from or writing data to a location on said track.

5. In a disc drive with at least one disc, at least one transducer for reading and writing data on said disc, an external interface connecting said disc drive to other elements within a computer system, a microprocessor including associated read-only memory and rapidly accessible read-write memory, said microprocessor executing a program suitable for interpreting commands received at said interface and in control of elements internal to said disc drive to execute said commands and provide appropriate information at said interface in response to said commands, said internal elements including means for positioning said transducer relative to said disc, said positioning means being responsive to said microprocessor-interpreted commands to position said transducer relative to said disc, the improvement comprising means for storing a list of media defects on tracks of said disc accessible only by said microprocessor and not directly addressable via said interface, means for said microprocessor to access said list to enable said microprocessor to prevent data transfers initiated by said commands at said interface to or from locations on said disc containing said media defects.

6. A disc drive as claimed in claim 5, including means for initiating said accessing of said media defect list as part of said drive's normal power-on initialization sequence.

7. A disc drive as claimed in claim 5, including means for decoding a specific command or set of commands at said interface and accessing said media defect list as part of the response to said command or commands.

8. A disc drive as claimed in claims 5 or 6, including means for decoding a second specific command received at said interface, means for accepting data received at said interface as part of said second command or associated with said second command as user-identified media defect information, means for converting the format of said user-identified media defect information, if such conversion is needed, and means for integrating said user-identified media defect information into said previously-determined list of media defect information for use by said microprocessor in preventing data transfers initiated by commands received at said interface from occurring at locations containing said user-identified media defects.

9. In a disc drive with at least one disc, at least one transducer for reading and writing data on said disc, an external interface connecting said disc drive to other elements within a computer system, a microprocessor including associated read-only memory and rapidly accessible read-write memory, said microprocessor executing a program suitable for interpreting commands received at said interface and in control of elements internal to said disc drive to execute said commands and provide appropriate information at said interface in response to said commands, said internal elements including means for positioning said transducer relative to said disc, said positioning means being responsive to said microprocessor-interpreted commands to position said transducer relative to said disc, a method of storing a list of media defects found during the manufacturing process and making said list available to said microprocessor for the use of said microprocessor in preventing data transfers to or from locations on said discs containing such defects, comprising the steps of identifying such found defects to said microprocessor during the manufacturing process, causing said microprocessor to control said positioning means in a manner to cause said positioning means to move said transducer to a track not directly accessible by said commands at said interface, writing said list of media defects on said track in a recoverable format recognizable and usable by said microprocessor, executing a certain set of instructions in said microprocessor program while said drive is installed in said computer system to cause said positioning means to move said transducer over said track containing said media defect list, reading said media defect list from said track on said disc into said rapidly-accessible read-write memory or other storage area within said disc drive internal elements, executing a second set of instructions in said microprocessor program to utilize said defect information to prevent data transfers initiated by said commands received at said interface from occurring at locations on said disc containing said media defects.

10. A method as claimed in claim 9, including the step of executing said sets of microprocessor program instructions as a part of said drive's power-on initialization routine.

11. A method as claimed in claim 9, including the step of executing said sets of microprocessor instructions in response to a specific command or set of commands received at said interface.

12. A method as claimed in claims 10 or 11, including the steps of decoding certain commands received at said interface as commands to add user-identified media defect information to said media defect list, receiving said user-identified media defect information from said interface, converting the format of said user-identified media defect information, if necessary, integrating said user-identified defect information with said previously stored list of media defect information, and utilizing said integrated list of media defect information to prevent data transfers initiated by commands received at said interface from occurring at locations on said disc containing media defects identified in said integrated list.

13. A method of accessing rotating storage media in a disc drive having an external interface connecting said disc drive to other elements within a computer system, a microprocessor including associated read-only memory and rapidly accessible read-write memory, said disc drive including means for positioning a transducer relative to said rotating storage media, the improvement comprising storing a list of media defects on tracks of said disc, said list of defects being accessible only by said microprocessor and not directly addressable via said interface, causing said microprocessor to access said list to enable said microprocessor to prevent data transfers initiated by commands at said interface to or from locations on said disc containing said media defects.

14. A method as claimed in claim 13 including the step of initiating the accessing of said media defect list as part of said drive's normal power-on initialization sequence.

15. A method as claimed in claim 13 wherein microprocessor executes specific instructions while said drive is installed in said computer to cause said positioning means to move said transducer over said track containing said media defect list, said instructions being executed in response to a specific command at said interface.

16. A method as claimed in claim 14 including the step of receiving user-identified media defect information, forming an integrated list comprising said user-identified media defect information with said previously stored list of media defect information, and utilizing said integrated list of media defect information to prevent data transfers initiated by commands received at said interfaces from occurring at locations on said disc containing media defects identified in said integrated list.

17. A method of avoiding accessing of defective locations on rotating storage media in a disc drive, the rotating media having addressable locations on user-accessible tracks and a list of media defects on non-user accessible tracks of said disc accessible only by a microprocessor incorporated in said disc drive and not via an external interface connecting said disc drive to other elements within a computer system, said list being made available to said microprocessor to prevent data transfers to or from said disc locations containing said defects, said microprocessor including the steps of causing said microprocessor to interpret commands from said computer to position a transducer over one of said non-user accessible tracks, reading said media defect list from said track into a storage area within said disc drive, utilizing said disc defect list to prevent data transfers initiated by commands received at said interface from occurring at said defective locations.

18. A method as claimed in claim 17 including the step of accessing the media defect list as part of said disc drive's initialization sequence.

19. A method as claimed in claim 18 including the steps of receiving user-identified media defect information at said disc drive, integrating said user identified media defect list with said previously-stored list of media defect information to form an integrated media defect list, and utilizing said integrated list of media defects to prevent data transfers at said locations on said disc containing media defects.

20. A method as claimed in claim 19 including the step of storing said list of defective locations in cylinder, head and sector format.

21. A method as claimed in claim 20 including the step of converting said user-identified media defect information to cylinder, head and sector format, prior to integrating said information with said previously-stored list.

22. A method as claimed in claim 17 including the steps of formatting sectors on tracks of said disc drive, defective sectors identified in said media defect list being bypassed in said formatting operation.

* * * * *